United States Patent
Houston

[15] 3,656,457
[45] Apr. 18, 1972

[54] TOILET FOR HOUSEHOLD PETS
[72] Inventor: James Houston, 520 East 137th Street, Bronx, N.Y. 10454
[22] Filed: Sept. 24, 1970
[21] Appl. No.: 75,185

[52] U.S. Cl. ............................................................119/1
[51] Int. Cl. ...................................A01k 31/04, A01k 29/00
[58] Field of Search................................................119/1

[56] References Cited

UNITED STATES PATENTS

| | | | |
|---|---|---|---|
| 2,053,594 | 9/1936 | Albert | 119/1 |
| 2,204,416 | 6/1940 | Kramer | 119/1 |
| 2,584,656 | 2/1952 | Anderson | 119/1 |
| 3,227,138 | 1/1966 | Campbell | 119/1 |
| 3,318,285 | 5/1967 | Betham | 119/1 |

Primary Examiner—Aldrich F. Medbery
Attorney—Allison C. Collard

[57] ABSTRACT

An apparatus for detachable securement to an existing conventional toilet bowl in a bathroom consisting of a body support structure having disposed on its top surface a pressure-sensitive switch activating a first solenoid, connected to a trap door mobilized when the pet steps on the switch. Included in the apparatus is a second solenoid, responsive to the door's closing, having an extended arm for detachable coupling to the flush handle of the existing bowl. A microswitch permits delayed operation of the second solenoid, allowing automated flushing. Power may be supplied to the apparatus by either batteries or standard household current.

5 Claims, 4 Drawing Figures

INVENTOR.
JAMES HOUSTON
ATTORNEY

INVENTOR.
JAMES HOUSTON
BY
ATTORNEY

TOILET FOR HOUSEHOLD PETS

This invention relates to an apparatus permitting a pet to use the bathroom facilities of the master's home.

More specifically, this invention relates to an apparatus permitting detachable securement to an existing toilet bowl and for subsequent automatic flushing responsive to the pet stepping on and leaving the apparatus.

In many situations, it is desirable to permit one's pet to use the household bathroom facilities. However, previous inventions have required additional plumbing and separate space allotted for the pet.

The apparatus, according to the invention, is designed to eliminate the necessity of both additional space and plumbing. The apparatus is constructed from standard materials which are easily assembled, and readily available. The apparatus is also constructed so that when it is not in use, it may be stored out of sight.

The apparatus includes a support structure which is detachably secured to the existing toilet bowl and includes a trap door operated by a first solenoid whose opening is responsive to the pet stepping on a pressure-sensitive switch included on the top portion of the structure. A second solenoid having an extended arm detachably secured to the existing flush handle is responsive, by means of a microswitch, to the pet leaving the pressure-sensitive switch, permitting automatic activation of the flushing cycle. In another embodiment of the invention, the trap door consists of a single member hinged in cantilevered manner. The apparatus of the invention may be powered by either standard household current or if desired, batteries.

It is, therefore, an object according to the present invention to provide an apparatus which permits in-house "walking" of a pet.

It is another object according to the present invention to provide an apparatus which may be detachably secured to an existing toilet bowl while providing complete cleanliness.

It is still a further object according to the present invention to provide an apparatus for automatic operation of an existing toilet bowl which is simple in design, easy to manufacture, and reliable in operation.

Other objects and features of the present invention will become apparent from the following detailed description considered in connection with the accompanying drawings which disclose the embodiments of the present invention. It is to be understood, however, that the drawings are designed for the purpose of illustration only and not as a definition of the limits of the invention.

In the drawings, wherein similar reference characters denote similar elements throughout the several views.

Figure 1:
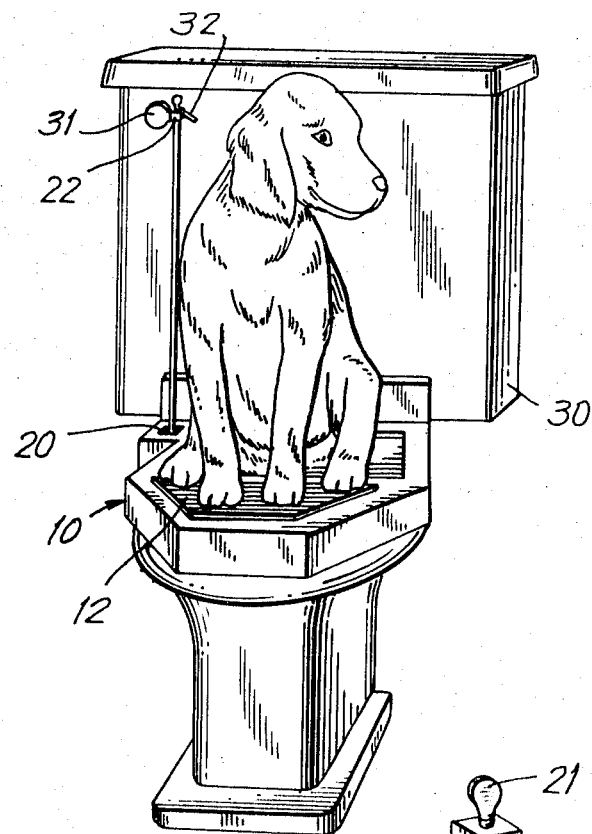
FIG. 1 is a perspective view of the invention installed on a conventional toilet.
Figure 2:
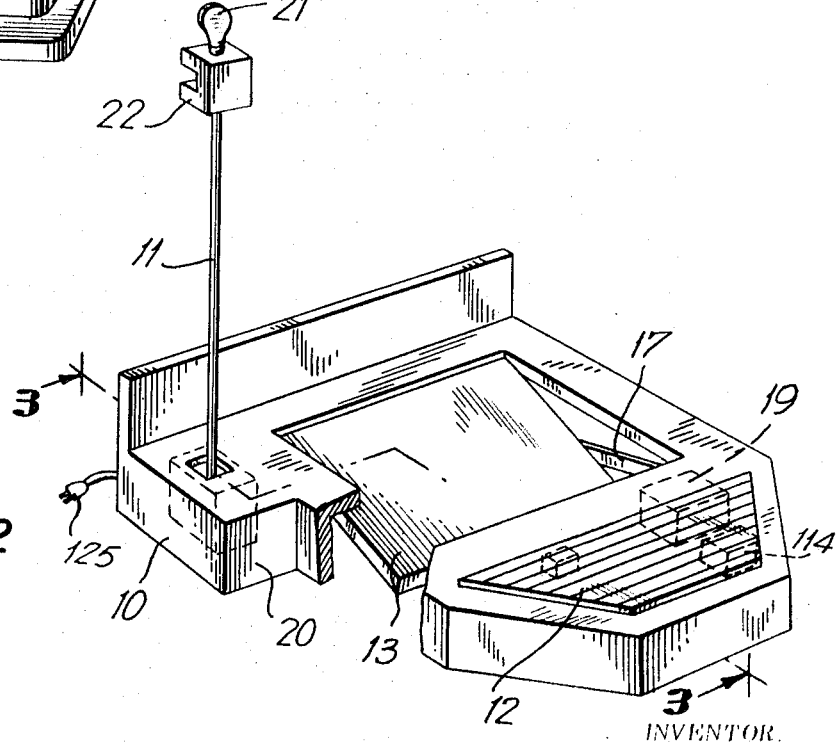
FIG. 2 is a detailed perspective view, partly in cross-section of the invention.

Referring to FIGS. 1–4, there is shown the apparatus contained within housing 10 mounted over the bowl of a conventional toilet. On the top front portion of housing 10 is disposed a pressure-sensitive pad or mat 12 which is electrically coupled to a solenoid 19 in order to open a trap door 13 positioned behind pad 12. Armature 14 of solenoid 19 is pivotably connected to linkage 17 which in turn, is pivotably connected to linkage 18. Linkage 18 is secured along the side of trap door 13. A pivotable latch 16 may also be provided to maintain door 13 in its closed position when the apparatus is not in use. The other end of trap door 13 is pivoted by means of hinge 15 to the back wall of housing 10. Also adjacent to the back wall is connected a second solenoid 20 having its armature coupled to an extending rod 11 which includes a catch 22 mounted on the end of rod 11. A wing screw 21 is threadably engaged in the top portion of catch 22 so that it can be tightened against arm 32 of flush lever 31. Mounted behind solenoid 19 is a momentary contact microswitch 114 having a plunger 115 for contact with the back end of armature 14, denoted by 14'. Switch 114 momentarily maintains its contacts closed when the plunger 115 is depressed by armature end 14' so that solenoid 20, connected in series therewith, will remain activated for a short period of time in order to pull downward on handle 32 of flush lever 31. Pressure-sensitive pad 12 may be constructed from any flexible material which is well known in the art and capable of closing a pair of contacts when depressed by a predetermined weight. Therefore, when a pet animal, such as a dog or cat, is trained to utilize the device of the subject invention, the weight of the pet upon mat 12 will close switch 112 to apply power from power source 25 across solenoid 19. Solenoid 19 will open door 13 when its armature 14 pushes linkages 17 and 18. The apparatus may be powered by batteries so as to be portable, or connected by means of cord 125 to a conventional power source.

Figure 3:
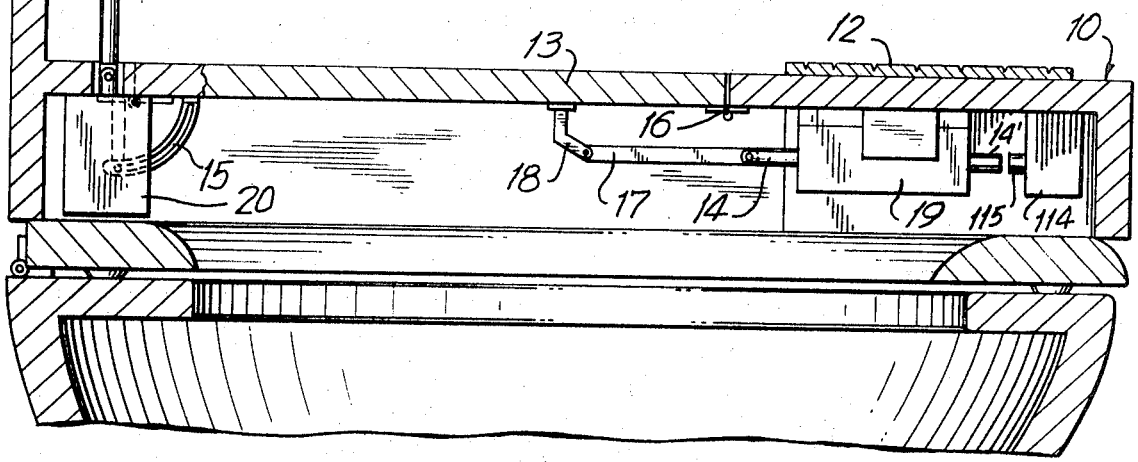
FIG. 3 is a cross-sectional view of the apparatus of the invention taken along line 3—3 of FIG. 2.
Figure 4:
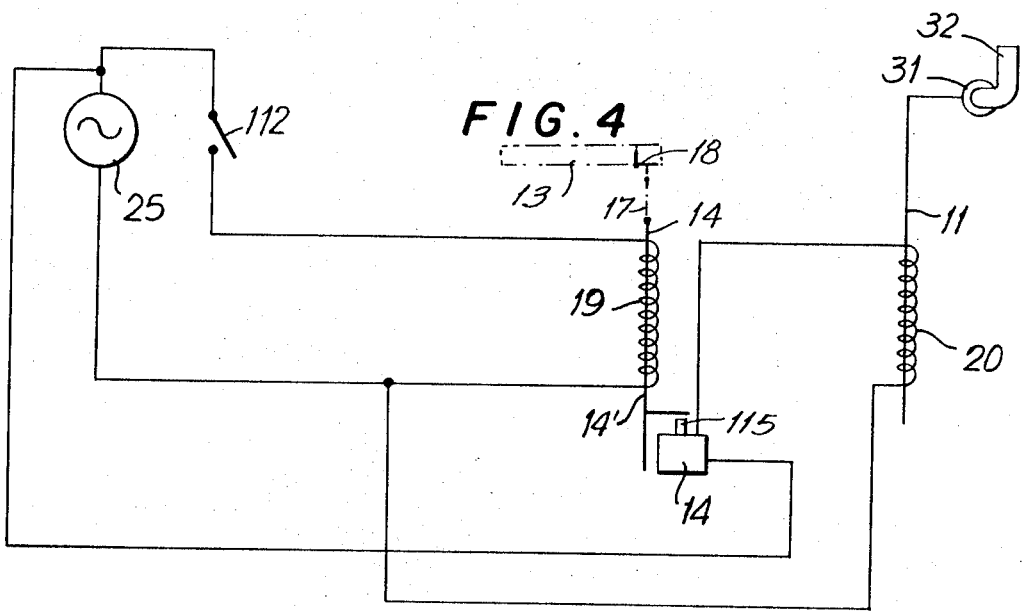
FIG. 4 is a partial schematic showing the cooperation of the electrical components of FIGS. 2 and 3.

When the animal leaves pad 12, solenoid 12 will return to its original position as shown in FIG. 3, causing armature end 14' to depress plunger 115 of switch 114. The closing of switch 114 will apply power to solenoid 20 so that its armature 11 will be pulled downward to operate flush lever 31. Since switch 114 is a momentary contact microswitch, solenoid 20 will be shortly interrupted to permit flush lever 31 to return to its normal position while the toilet bowl is being flushed.

The apparatus of the invention may be constructed from readily available materials and easily mass produced in large quantities. Preferably, the material will be plastic, but metal may be used if desired. The apparatus may be stored completely out of sight when not in use. Moreover, the only part of the apparatus that comes in contact with the pet is the pressure-sensitive switch.

While only one embodiment of the present invention has been shown and described, it will be understood that many changes and modifications may be made thereunto without departing from the spirit and scope of the invention.

What is claimed is:

1. An automatic pet toilet for detachable securement to a ordinary human toilet bowl comprising;
    a housing for disposal over the toilet bowl,
    a pressure-sensitive switch disposed on the top surface of said housing for receiving and supporting the pet,
    a downwardly opening trap door pivoted within said housing and positioned adjacent to said pressure-sensitive switch, and centered over the toilet bowl, and
    a first solenoid secured within said housing and having its armature coupled to open and close said trap door, said solenoid having its electrical input coupled to said pressure-sensitive switch, so that when the pet steps on the pressure-sensitive switch, the first solenoid opens the trap door to expose the toilet bowl adjacent to the switch.

2. The pet toilet as recited in claim 1, additionally comprising a second solenoid secured within said housing having an extended arm detachably coupled to the flush handle of the toilet, and
    a microswitch coupled to said second solenoid and responsive to the closing of said trap door for actuating said second solenoid to flush the toilet upon closure of the trap door.

3. The pet toilet as recited in claim 2, wherein said pressure-sensitive switch is a mat disposed on the top front surface of said housing.

4. The pet toilet as recited in claim 3, wherein said microswitch is a momentary contact switch having its plunger disposed for contact with the armature of said first solenoid.

5. The pet toilet as recited in claim 4 additionally comprising battery means disposed within said housing and electrically coupled to said first and second solenoids through said pressure-sensitive switch and said microswitch.

* * * * *